(12) United States Patent
Rabin et al.

(10) Patent No.: US 9,504,917 B2
(45) Date of Patent: Nov. 29, 2016

(54) SYSTEMS AND METHODS FOR CONTROL DEVICE INCLUDING A MOVEMENT DETECTOR

(71) Applicant: Nintendo Co., Ltd., Kyoto (JP)

(72) Inventors: Steven Rabin, Redmond, WA (US); Keizo Ohta, Kyoto (JP); Kenta Sato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 547 days.

(21) Appl. No.: 14/094,372

(22) Filed: Dec. 2, 2013

(65) Prior Publication Data

US 2014/0121019 A1    May 1, 2014

Related U.S. Application Data

(60) Division of application No. 12/801,048, filed on May 19, 2010, now abandoned, which is a continuation of application No. 12/572,924, filed on Oct. 2, 2009, now abandoned, which is a continuation of application No. 12/379,212, filed on Feb. 17, 2009, now abandoned, which is a continuation of application No. 12/213,880, filed on Jun. 25, 2008, now abandoned.

(60) Provisional application No. 60/929,392, filed on Jun. 25, 2007.

(51) Int. Cl.
| | |
|---|---|
| *A63F 13/428* | (2014.01) |
| *A63F 13/573* | (2014.01) |
| *A63F 13/812* | (2014.01) |
| *A63F 13/211* | (2014.01) |
| *G06F 3/01* | (2006.01) |
| *G06F 3/03* | (2006.01) |
| *G06F 3/0346* | (2013.01) |

(52) U.S. Cl.
CPC ............ *A63F 13/428* (2014.09); *A63F 13/211* (2014.09); *A63F 13/573* (2014.09); *A63F 13/812* (2014.09); *G06F 3/017* (2013.01); *G06F 3/0325* (2013.01); *G06F 3/0346* (2013.01); *A63F 2300/105* (2013.01); *A63F 2300/6045* (2013.01); *A63F 2300/8011* (2013.01)

(58) Field of Classification Search
CPC .... G06F 3/017; G06F 3/0325; A63F 13/211; A63F 13/573; A63F 13/428; A63F 13/812; A63F 2300/105; A63F 2300/6045; A63F 2300/8011
USPC ............. 463/30, 31, 36, 37, 38, 39; 715/863
See application file for complete search history.

(56) References Cited

U.S. PATENT DOCUMENTS

| | | | | |
|---|---|---|---|---|
| 5,598,187 | A | * | 1/1997 | Ide ........................ G06F 3/0346 345/156 |
| 5,627,565 | A | * | 5/1997 | Morishita ............. G06F 3/0325 345/157 |
| 5,741,182 | A | | 4/1998 | Lipps et al. |
| 5,930,741 | A | | 7/1999 | Kramer |
| 6,162,123 | A | | 12/2000 | Woolston |

(Continued)

*Primary Examiner* — William H McCulloch, Jr.
(74) *Attorney, Agent, or Firm* — Nixon & Vandehye, P.C.

(57) ABSTRACT

An example image processing system and method uses a control device including a movement detector. Gesture inputs corresponding to a gesture made by moving the control device are used for animation. An animation begins based on at least one gesture input received prior to completion of the gesture and the animation is modified based on at least one gesture input received after the beginning of the animation.

19 Claims, 21 Drawing Sheets

Complex Gesture Recognition:

- Interpolate ball to desired trajectory

(56) References Cited

U.S. PATENT DOCUMENTS

| | | | |
|---|---|---|---|
| 6,545,661 B1 | 4/2003 | Goschy et al. | |
| 6,902,482 B1 | 6/2005 | Woolston | |
| 6,982,697 B2 | 1/2006 | Wilson et al. | |
| 7,158,118 B2* | 1/2007 | Liberty | G06F 3/017 345/156 |
| 7,247,097 B2 | 7/2007 | Woolston | |
| 7,262,760 B2 | 8/2007 | Liberty | |
| 7,352,358 B2* | 4/2008 | Zalewski | A63F 13/10 345/156 |
| 7,379,841 B2* | 5/2008 | Ohta | G06F 3/0346 702/154 |
| 7,414,611 B2* | 8/2008 | Liberty | G06F 3/017 345/156 |
| 7,424,388 B2* | 9/2008 | Sato | A63F 13/06 345/156 |
| 7,596,466 B2* | 9/2009 | Ohta | A63F 13/10 702/152 |
| 7,658,676 B2* | 2/2010 | Ohta | A63F 13/10 345/158 |
| 7,684,958 B2* | 3/2010 | Ohta | G01C 22/006 702/141 |
| 7,698,096 B2* | 4/2010 | Ohta | A63F 13/06 702/151 |
| 7,711,505 B2* | 5/2010 | Ohta | A63F 13/02 702/85 |
| 7,716,008 B2* | 5/2010 | Ohta | A63F 13/10 702/141 |
| 7,774,155 B2* | 8/2010 | Sato | A63F 13/06 345/156 |
| 7,786,976 B2* | 8/2010 | Ohta | G06F 3/0346 345/156 |
| 7,831,064 B2* | 11/2010 | Ohta | A63F 13/00 345/158 |
| 7,833,099 B2* | 11/2010 | Sato | A63F 13/06 463/37 |
| 7,834,848 B2* | 11/2010 | Ohta | G06F 3/0325 345/157 |
| 7,871,330 B2 | 1/2011 | Woolston | |
| 7,877,224 B2* | 1/2011 | Ohta | A63F 13/10 702/152 |
| 7,920,985 B2* | 4/2011 | Ohta | G06F 3/0346 702/154 |
| 7,924,264 B2* | 4/2011 | Ohta | A63F 13/04 345/157 |
| 7,925,467 B2* | 4/2011 | Ohta | A63F 13/02 702/150 |
| 7,931,535 B2* | 4/2011 | Ikeda | A63F 13/24 345/156 |
| 7,966,148 B2* | 6/2011 | Ohta | G01C 22/006 702/160 |
| 7,980,952 B2* | 7/2011 | Ohta | A63F 13/06 345/156 |
| 7,988,558 B2* | 8/2011 | Sato | A63F 13/06 463/37 |
| 8,000,924 B2* | 8/2011 | Sato | A63F 13/06 382/103 |
| 8,038,531 B2* | 10/2011 | Sato | A63F 13/10 463/32 |
| 8,041,536 B2* | 10/2011 | Ohta | A63F 13/10 702/152 |
| 8,100,769 B2* | 1/2012 | Rabin | A63F 13/06 463/30 |
| 8,956,229 B2* | 2/2015 | Suzuki | A63F 13/428 463/36 |
| 8,974,301 B2* | 3/2015 | Suzuki | A63F 13/211 463/30 |
| 8,979,653 B2* | 3/2015 | Suzuki | A63F 13/211 463/36 |
| 8,992,322 B2* | 3/2015 | Endo | G06F 3/016 463/37 |
| 2001/0015123 A1 | 8/2001 | Nishitani et al. | |
| 2001/0024973 A1 | 9/2001 | Meredith | |
| 2002/0072418 A1 | 6/2002 | Masuyama et al. | |
| 2003/0066413 A1 | 4/2003 | Nishitani et al. | |
| 2003/0120183 A1* | 6/2003 | Simmons | A61F 4/00 600/595 |
| 2003/0167908 A1* | 9/2003 | Nishitani | G10H 1/00 84/723 |
| 2004/0204240 A1 | 10/2004 | Barney | |
| 2005/0085298 A1 | 4/2005 | Woolston | |
| 2005/0093868 A1* | 5/2005 | Hinckley | G06F 3/011 345/502 |
| 2005/0110751 A1 | 5/2005 | Wilson et al. | |
| 2005/0119036 A1 | 6/2005 | Albanna et al. | |
| 2005/0143173 A1 | 6/2005 | Barney et al. | |
| 2005/0227775 A1 | 10/2005 | Cassady et al. | |
| 2005/0261073 A1* | 11/2005 | Farrington | A63B 69/3632 473/221 |
| 2006/0003839 A1 | 1/2006 | Lawrence et al. | |
| 2006/0025229 A1* | 2/2006 | Mahajan | A63B 24/0003 473/131 |
| 2006/0025299 A1 | 2/2006 | Mahajan et al. | |
| 2006/0166738 A1 | 7/2006 | Eyestone et al. | |
| 2006/0178212 A1 | 8/2006 | Penzias | |
| 2006/0252474 A1 | 11/2006 | Zalewski et al. | |
| 2007/0049374 A1* | 3/2007 | Ikeda | A63F 13/06 463/30 |
| 2007/0050597 A1* | 3/2007 | Ikeda | A63F 13/06 712/1 |
| 2007/0052177 A1* | 3/2007 | Ikeda | A63F 13/24 273/317 |
| 2007/0060391 A1* | 3/2007 | Ikeda | A63F 13/06 463/46 |
| 2007/0066394 A1 | 3/2007 | Ikeda et al. | |
| 2007/0072674 A1* | 3/2007 | Ohta | A63F 13/00 463/37 |
| 2007/0213128 A1* | 9/2007 | Ohta | A63F 13/04 463/36 |
| 2007/0259716 A1* | 11/2007 | Mattice | G06F 3/013 463/36 |
| 2007/0265084 A1* | 11/2007 | Sato | A63F 13/06 463/37 |
| 2007/0265085 A1* | 11/2007 | Miyamoto | A63F 13/06 463/37 |
| 2007/0270223 A1* | 11/2007 | Nonaka | A63F 13/00 463/37 |
| 2008/0192005 A1* | 8/2008 | Elgoyhen | G06F 3/014 345/158 |
| 2008/0242385 A1* | 10/2008 | Miyamoto | A63F 13/06 463/1 |
| 2008/0248872 A1* | 10/2008 | Endo | A63F 13/10 463/36 |
| 2008/0248881 A1* | 10/2008 | Endo | A63F 13/10 463/43 |
| 2008/0254898 A1* | 10/2008 | Endo | A63F 13/10 463/43 |
| 2008/0261692 A1* | 10/2008 | Endo | A63F 13/10 463/31 |
| 2008/0291160 A1 | 11/2008 | Rabin | |
| 2008/0313575 A1 | 12/2008 | Wilson | |
| 2009/0104993 A1* | 4/2009 | Ye | A63F 13/06 463/39 |
| 2009/0164952 A1 | 6/2009 | Wilson | |
| 2009/0170057 A1* | 7/2009 | Yu | G09B 7/02 434/308 |
| 2010/0095773 A1 | 4/2010 | Shaw et al. | |
| 2010/0097316 A1* | 4/2010 | Shaw | G06F 3/0346 345/158 |
| 2010/0121227 A1 | 5/2010 | Stirling et al. | |
| 2010/0292007 A1* | 11/2010 | Rabin | G06F 3/017 463/36 |
| 2011/0007079 A1* | 1/2011 | Perez | G06F 3/011 345/473 |
| 2014/0121019 A1* | 5/2014 | Rabin | G06F 3/017 463/36 |

* cited by examiner

NON-LIMITING
EXAMPLE GAME SYSTEM

NON-LIMITING EXAMPLE CONTROLLER

NON-LIMITING EXAMPLE CONTROLLER

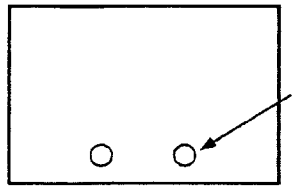

When controller 107 is pointed upward, the coordinates of the markers move down.

*Fig. 5B-1*

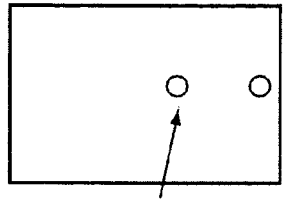

When controller 107 is pointed left, the coordinates of the markers move to the right.

*Fig. 5B-2*

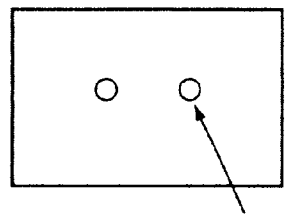

*Fig. 5B-3* When the markers are in the center of the coordinates, the controller 107 is pointing to the middle of the screen.

When controller 107 is pointed right, the coordinates of the markers move to the left.

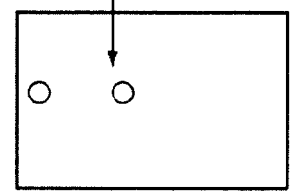

*Fig. 5B-4*

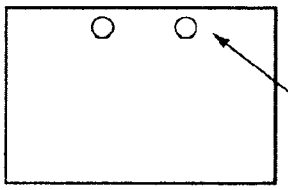

When controller 107 is pointed downward, the coordinates of the markers move up.

*Fig. 5B-5*

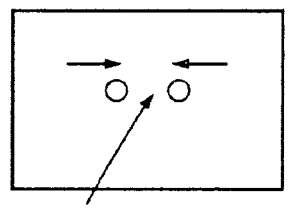

When controller 107 is moved away from markers 108a, 108b, the distance between the markers shrinks.

*Fig. 5B-6*

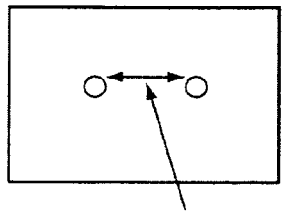

When controller 107 is moved toward markers 108a, 108b, the distance between the markers expands.

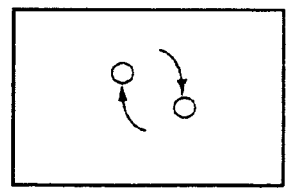

When controller 107 is rotated, the marker coordinates will rotate.

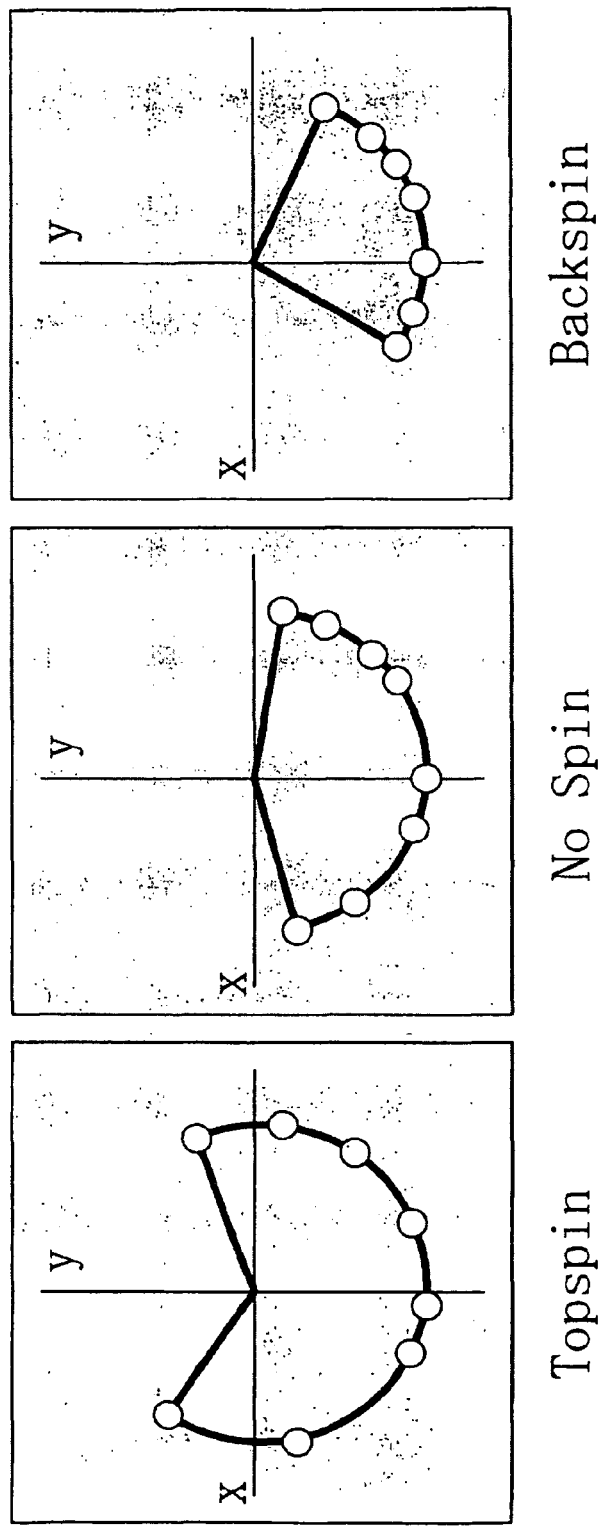
Complex Gesture Recognition:
Topspin, No Spin, or Backspin  Fig. 7B

Complex Gesture Recognition:
Underhand or Overhand

- Look at z-axis before swing
  - Negative = Overhand
  - Positive = Underhand

Complex Gesture Recognition:

- Time B: Detect underhand or overhand

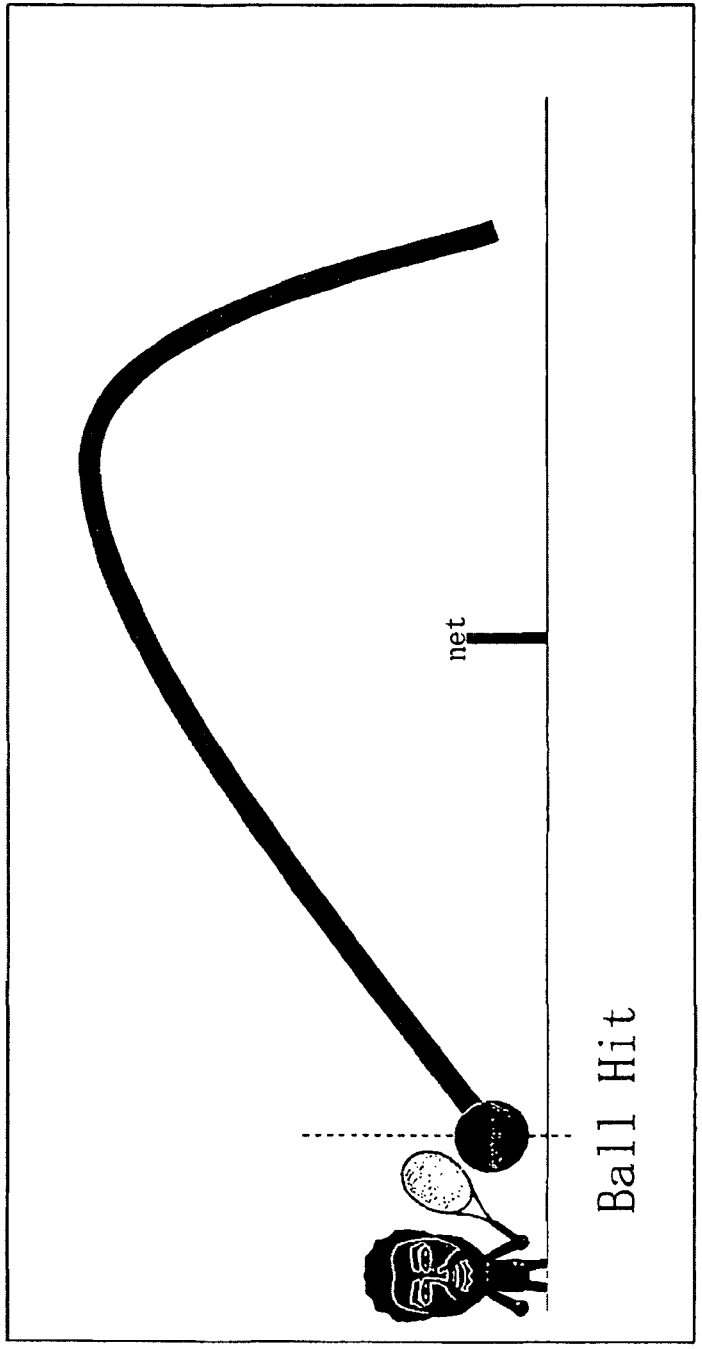

SYSTEMS AND METHODS FOR CONTROL DEVICE INCLUDING A MOVEMENT DETECTOR

CROSS-REFERENCE TO RELATED APPLICATION

This application is a divisional of application Ser. No. 12/801,048, filed May 19, 2010, which is a continuation of application Ser. No. 12/572,924, filed Oct. 2, 2009, which is a continuation of application Ser. No. 12/379,212, filed Feb. 17, 2009, which is a continuation of application Ser. No. 12/213,880, filed Jun. 25, 2008, which claims benefit of priority from U.S. Provisional Application No. 60/929,392, filed on Jun. 25, 2007, the entire contents of each of which are incorporated herein in their entirety.

BACKGROUND AND SUMMARY

This application generally describes example systems and methods for generating animation in response to gestures made using a control device including a movement detector.

User inputs to computer systems may be supplied in various ways. For example, when the computer system is a video game console, inputs are typically supplied using cross-switches, joysticks, buttons and the like provided on a controller. A cross-switch or a joystick may be used to control movement of a video game object in various directions and various buttons may be used to control character actions such as jumping, using a weapon and the like.

The controller described in this patent application additionally or alternatively includes an accelerometer arrangement that generates inputs to a video game console or other computer system based on certain movements and/or orientations of the controller. Such a controller can provide a more intuitive user interface in which, for example, movement of a video game object can be controlled by moving the controller in a particular manner. By way of illustration, a player may increase or decrease the altitude of a plane in a video game by tilting the controller up or down. The accelerometer arrangement can be used to provide gaming experiences that cannot be provided easily (if at all) using a controller having cross-switches, joysticks, buttons, etc.

This patent application describes example image processing systems and methods using a control device including a movement detector. Gesture inputs corresponding to a gesture made by moving the control device are used for animation. An animation begins based on at least one input for the gesture received prior to completion of the gesture and the animation is modified based on at least one other input for the gesture received after the beginning of the animation.

BRIEF DESCRIPTION OF THE DRAWINGS

FIGS. 5B-1 to 5B-8 are used in an explanation of how a direction in which example controller 107 is pointing is determined.

FIG. 6 shows example z-axis accelerometer outputs for a swing made in a tennis game using controller 107.

FIG. 7B shows example x-axis and y-axis accelerometer outputs associated with applying top spin, no spin or back spin to a hit tennis ball.

FIGS. 9A-9D show example trajectories of hit tennis balls.

DETAILED DESCRIPTION OF EXAMPLE EMBODIMENTS

Figure 1:
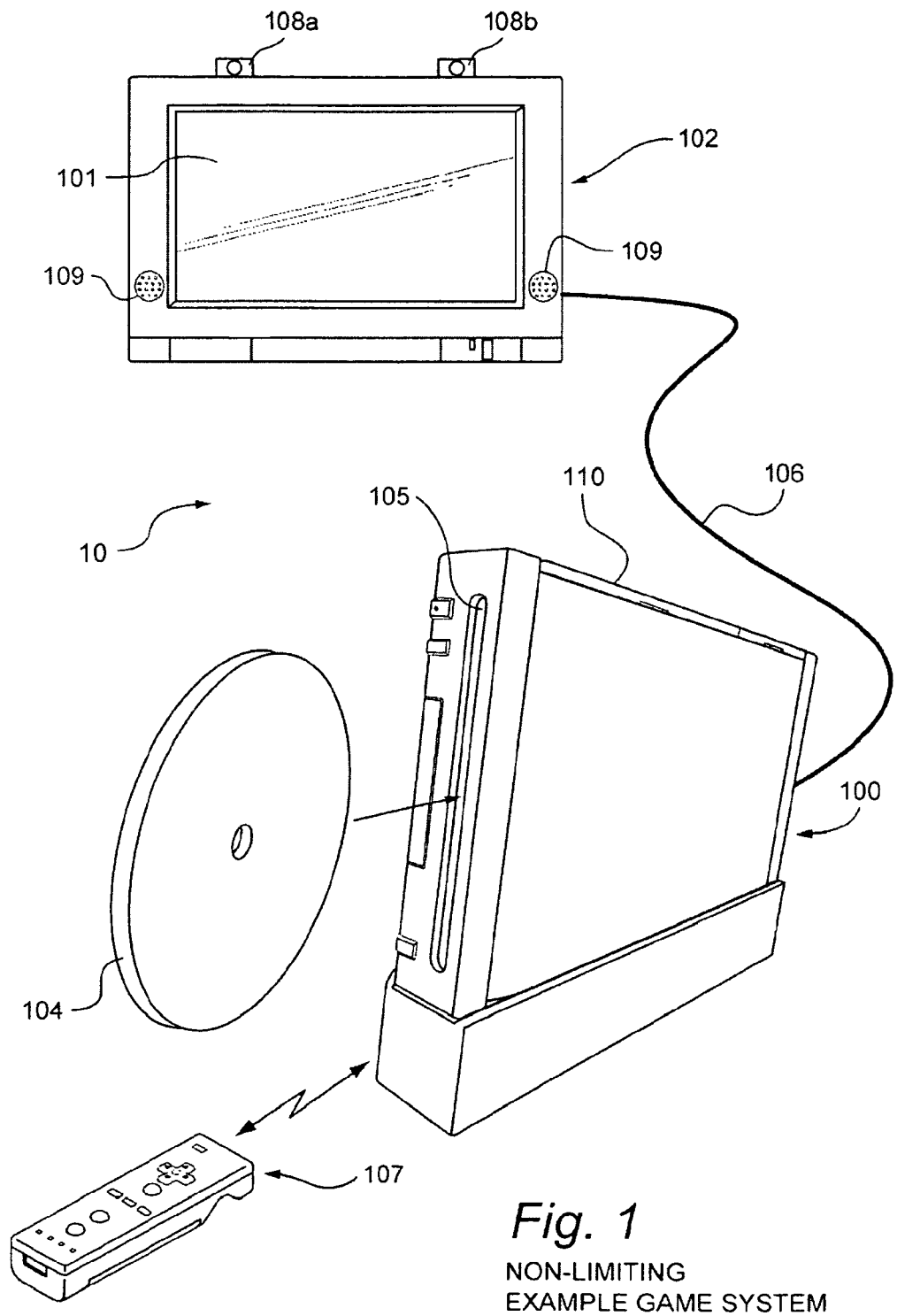
FIG. 1 is a diagram of an example game system 10.

FIG. 1 shows a non-limiting example game system 10 including a game console 100, a television 102 and a controller 107.

Game console 100 executes a game program or other application stored on optical disc 104 inserted into slot 105 formed in housing 110 thereof. The result of the execution of the game program or other application is displayed on display screen 101 of television 102 to which game console 100 is connected by cable 106. Audio associated with the game program or other application is output via speakers 109 of television 102. While an optical disk is shown in FIG. 1, the game program or other application may alternatively or additionally be stored on other storage media such as semiconductor memories, magneto-optical memories, magnetic memories and the like.

Controller 107 wirelessly transmits data such as game control data to the game console 100. The game control data may be generated using an operation section of controller 107 having, for example, a plurality of operation buttons, a key, a stick and the like. Controller 107 may also wirelessly receive data transmitted from game console 100. Any one of various wireless protocols such as Bluetooth (registered trademark) may be used for the wireless transmissions between controller 107 and game console 100.

As discussed below, controller 107 also includes an imaging information calculation section for capturing and processing images from light-emitting devices 108a and 108b. Although markers 108a and 108b are shown in FIG. 1 as being above television 100, they may also be positioned below television 100. In one implementation, a center point between light-emitting devices 108a and 108b is substantially aligned with a vertical center-line of display screen 101. The images from light-emitting devices 108a and 108b can be used to determine a direction in which controller 107 is pointing as well as a distance of controller 107 from display screen 101. By way of example without limitation, light-emitting devices 108a and 108b may be implemented as two LED modules (hereinafter, referred to as "markers") provided in the vicinity of the display screen of television 102. The markers each output infrared light and the imaging information calculation section of controller 107 detects the light output from the LED modules to determine a direction in which controller 107 is pointing and a distance of controller 107 from display 101 as mentioned above.

Figure 2:
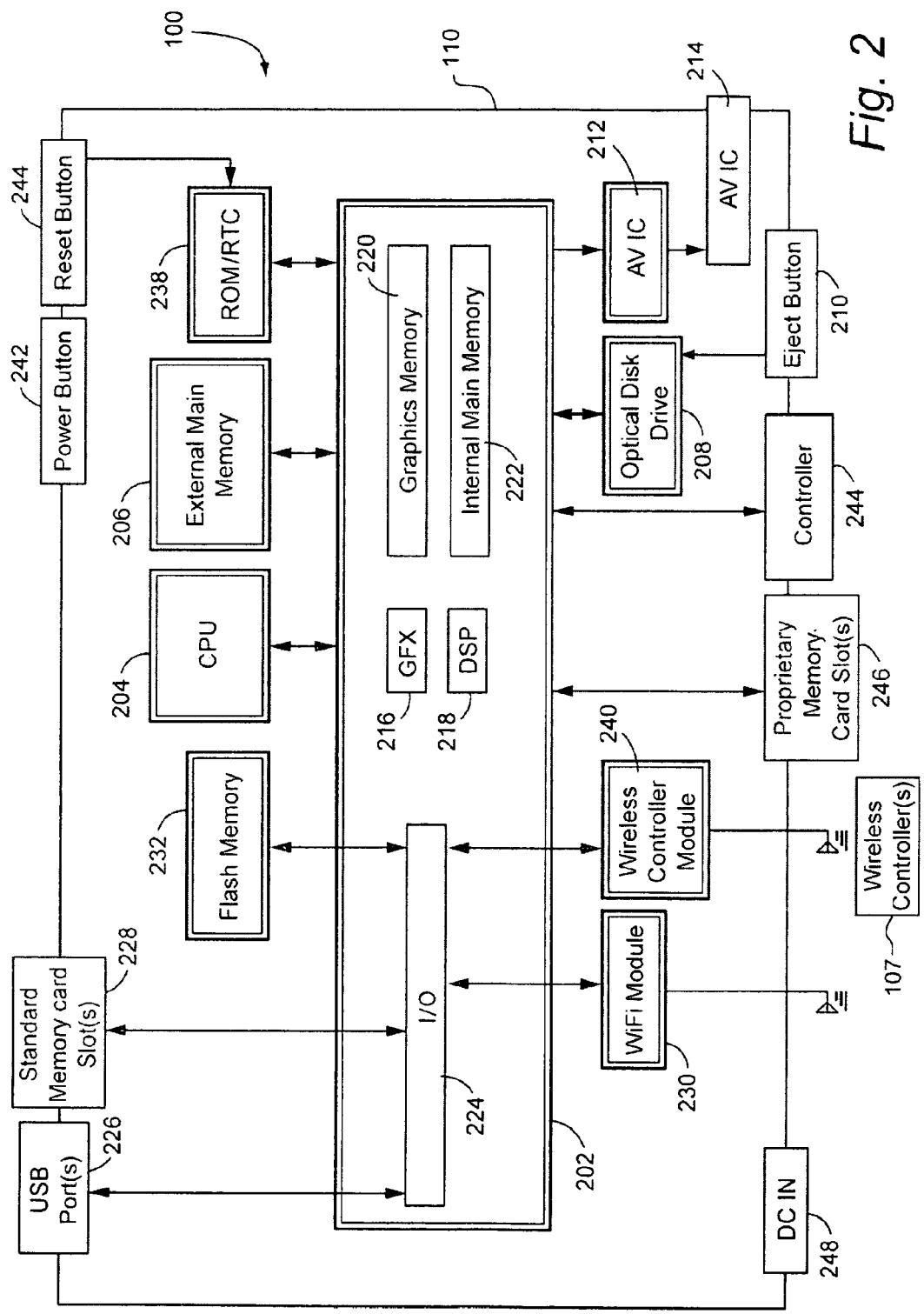
FIG. 2 is a block diagram of example game console 100 shown in FIG. 1.

With reference to the block diagram of FIG. 2, game console 100 includes a RISC central processing unit (CPU) 204 for executing various types of applications including (but not limited to) video game programs. CPU 204 executes a boot program stored, for example, in a boot ROM to initialize game console 100 and then executes an application (or applications) stored on optical disc 104, which is inserted in optical disk drive 208. User-accessible eject button 210 provided on housing 110 of game console 100 may be used to eject an optical disk from disk drive 208.

In one example implementation, optical disk drive 208 receives both optical disks of a first type (e.g., of a first size and/or of a first data structure, etc.) containing applications developed to take advantage of the capabilities of CPU 204 and graphics processor 216 and optical disks of a second type (e.g., of a second size and/or a second data structure) containing applications originally developed for execution by a CPU and/or graphics processor having capabilities different than those of CPU 204 and/or graphics processor 216. For example, the optical disks of the second type may be applications originally developed for the Nintendo Game-Cube platform.

CPU 204 is connected to system LSI 202 that includes graphics processing unit (GPU) 216 with an associated graphics memory 220, audio digital signal processor (DSP) 218, internal main memory 222 and input/output (IO) processor 224.

IO processor 224 of system LSI 202 is connected to one or more USB ports 226, one or more standard memory card slots (connectors) 228, WiFi module 230, flash memory 232 and wireless controller module 240.

USB ports 226 are used to connect a wide variety of external devices to game console 100. These devices include by way of example without limitation game controllers, keyboards, storage devices such as external hard-disk drives, printers, digital cameras, and the like. USB ports 226 may also be used for wired network (e.g., LAN) connections. In one example implementation, two USB ports 226 are provided.

Standard memory card slots (connectors) 228 are adapted to receive industry-standard-type memory cards (e.g., SD memory cards). In one example implementation, one memory card slot 228 is provided. These memory cards are generally used as data carriers but of course this use is provided by way of illustration, not limitation. For example, a player may store game data for a particular game on a memory card and bring the memory card to a friend's house to play the game on the friend's game console. The memory cards may also be used to transfer data between the game console and personal computers, digital cameras, and the like.

WiFi module 230 enables game console 100 to be connected to a wireless access point. The access point may provide internet connectivity for on-line gaming with players at other locations (with or without voice chat capabilities), as well as web browsing, e-mail, file downloads (including game downloads) and many other types of on-line activities. In some implementations, WiFi module 230 may also be used for communication with other game devices such as suitably-equipped hand-held game devices. Module 230 is referred to herein as "WiFi", which is generally a designation used in connection with the family of IEEE 802.11 specifications. However, game console 100 may of course alternatively or additionally use wireless modules that conform to other wireless standards.

Flash memory 232 stores, by way of example without limitation, game save data, system files, internal applications for the console and downloaded data (such as games).

Wireless controller module 240 receives signals wirelessly transmitted from one or more controllers 107 and provides these received signals to IO processor 224. The signals transmitted by controller 107 to wireless controller module 240 may include signals generated by controller 107 itself as well as by other devices that may be connected to controller 107. By way of example, some games may utilize separate right- and left-hand inputs. For such games, another controller (not shown) may be connected (e.g., by a wired connection) to controller 107 and controller 107 can transmit to wireless controller module 240 signals generated by itself and by the other controller.

Wireless controller module 240 may also wirelessly transmit signals to controller 107. By way of example without limitation, controller 107 (and/or another game controller connected thereto) may be provided with vibration circuitry and vibration circuitry control signals may be sent via wireless controller module 240 to control the vibration circuitry (e.g., by turning the vibration circuitry on and off). By way of further example without limitation, controller 107 may be provided with (or be connected to) a speaker (not shown) and audio signals for output from this speaker may be wirelessly communicated to controller 107 via wireless controller module 240. By way of still further example without limitation, controller 107 may be provided with (or be connected to) a display device (not shown) and display signals for output from this display device may be wirelessly communicated to controller 107 via wireless controller module 240. Proprietary memory card slots 246 are adapted to receive proprietary memory cards. In one example implementation, two such slots are provided. These proprietary memory cards have some non-standard feature(s) such as a non-standard connector and/or a non-standard memory architecture. For example, one or more of the memory card slots 246 may be adapted to receive memory cards used with the Nintendo GameCube platform. In this case, memory cards inserted in such slots can transfer data from games developed for the GameCube platform. In an example implementation, memory card slots 246 may be used for read-only access to the memory cards inserted therein and limitations may be placed on whether data on these memory cards can be copied or transferred to other storage media such as standard memory cards inserted into slots 228.

One or more controller connectors 244 are adapted for wired connection to respective game controllers. In one example implementation, four such connectors are provided for wired connection to game controllers for the Nintendo GameCube platform. Alternatively, respective wireless receivers may be connected to connectors 244 to receive signals from wireless game controllers. These connectors enable players, among other things, to use controllers for the Nintendo GameCube platform when an optical disk for a game developed for this platform is inserted into optical disk drive 208.

A connector 248 is provided for connecting game console 100 to DC power derived, for example, from an ordinary wall outlet. Of course, the power may be derived from one or more batteries.

GPU 216 performs image processing based on instructions from CPU 204. GPU 216 includes, for example, circuitry for performing calculations necessary for displaying three-dimensional (3D) graphics. GPU 216 performs image processing using graphics memory 220 dedicated for image processing and a part of internal main memory 222. GPU 216 generates image data for output to television 102 by audio/video connector 214 via audio/video IC (interface) 212.

Audio DSP 218 performs audio processing based on instructions from CPU 204. The audio generated by audio DSP 218 is output to television 102 by audio/video connector 214 via audio/video IC 212.

External main memory 206 and internal main memory 222 are storage areas directly accessible by CPU 204. For example, these memories can store an application program such as a game program read from optical disc 104 by the CPU 204, various types of data or the like.

ROM/RTC 238 includes a real-time clock and preferably runs off of an internal battery (not shown) so as to be usable even if no external power is supplied. ROM/RTC 238 also may include a boot ROM and SRAM usable by the console.

Power button 242 is used to power game console 100 on and off. In one example implementation, power button 242 must be depressed for a specified time (e.g., one or two seconds) to turn the console off so as to reduce the possibility of inadvertently turn-off. Reset button 244 is used to reset (re-boot) game console 100.

Figure 3A:
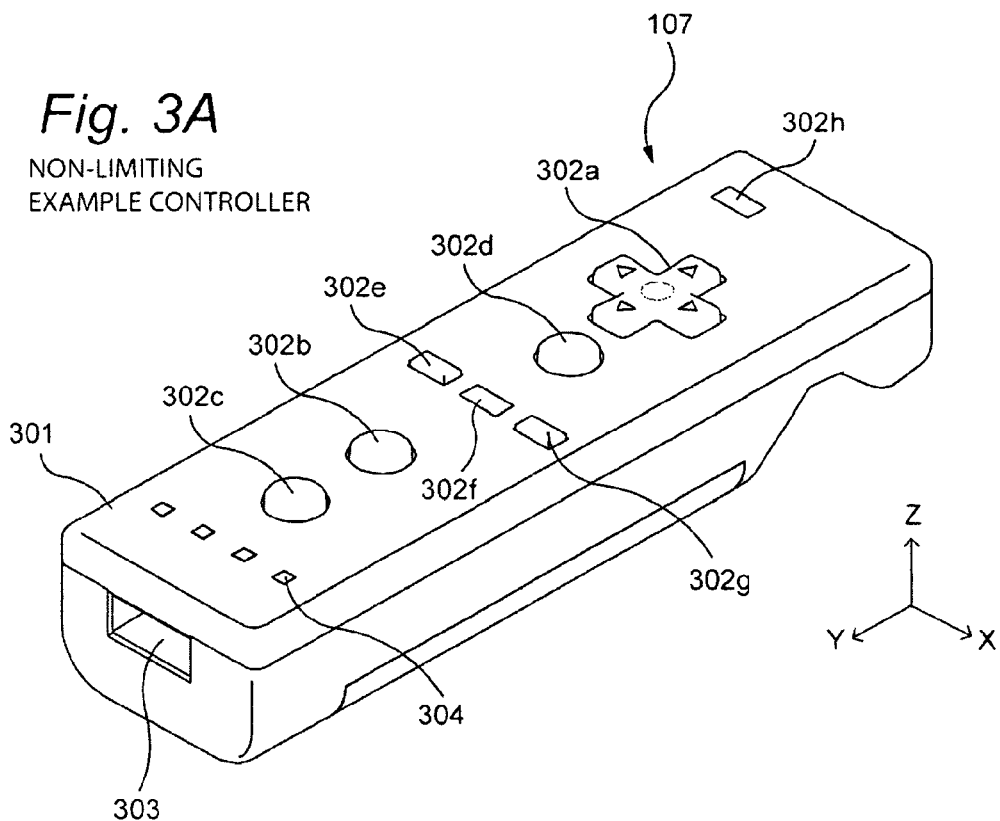
FIGS. 3A and 3B are perspective views of a top and a bottom of example controller 107 shown in FIG. 1.
Figure 3B:
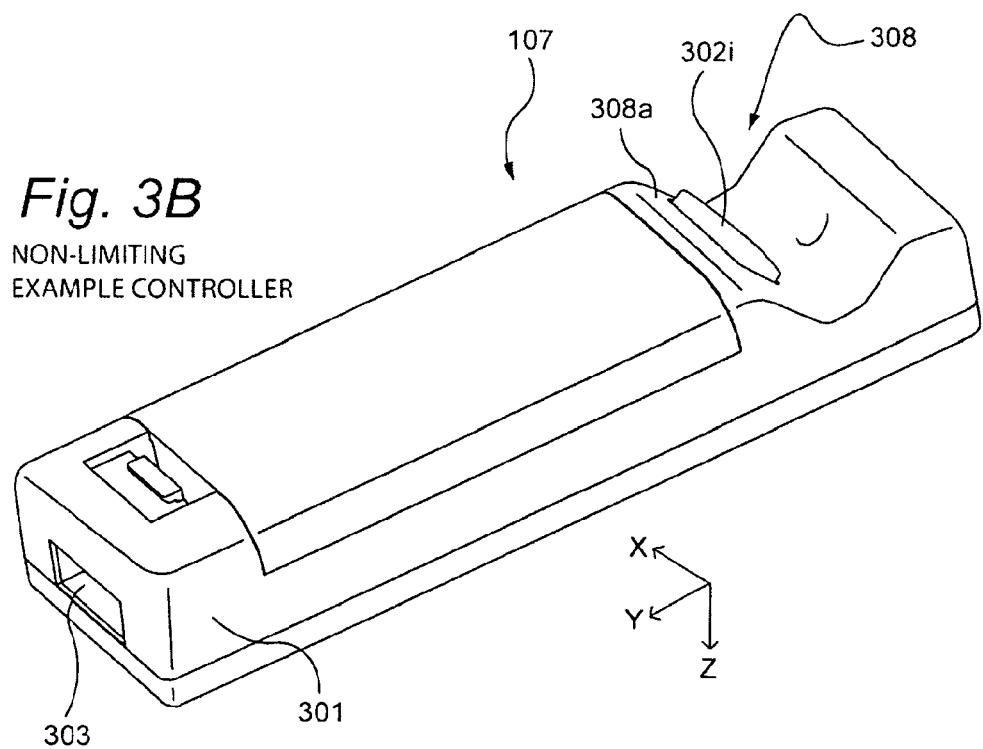
Figure 4:
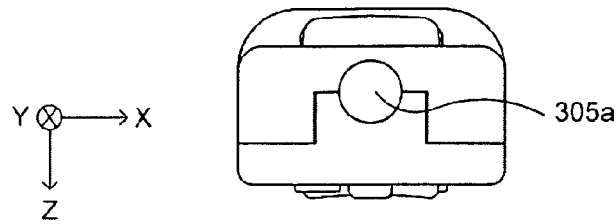
FIG. 4 is a front view of example controller 107 shown in FIG. 1.

With reference to FIGS. 3 and 4, example controller 107 includes a housing 301 on which operating controls 302a-302h are provided. Housing 301 has a generally parallelepiped shape and is sized to be conveniently grasped by a player's hand. Cross-switch 302a is provided at the center of a forward part of a top surface of the housing 301. Cross-switch 302a is a cross-shaped four-direction push switch which includes operation portions corresponding to the directions designated by the arrows (front, rear, right and left), which are respectively located on cross-shaped projecting portions. A player selects one of the front, rear, right and left directions by pressing one of the operation portions of the cross-switch 302a. By actuating cross-switch 302a, the player can, for example, move a character in different directions in a virtual game world.

Cross-switch 302a is described by way of example and other types of operation sections may be used. By way of example without limitation, a composite switch including a push switch with a ring-shaped four-direction operation section and a center switch may be used. By way of further example without limitation, an inclinable stick projecting from the top surface of housing 301 that outputs signals in accordance with the inclining direction of the stick may be used. By way of still further example without limitation, a horizontally slidable disc-shaped member that outputs signals in accordance with the sliding direction of the disc-shaped member may be used. By way of still further example without limitation, a touch pad may be used. By way of still further example without limitation, separate switches corresponding to at least four directions (e.g., front, rear, right and left) that output respective signals when pressed by a player can be used.

Buttons (or keys) 302b through 302g are provided rearward of cross-switch 302a on the top surface of housing 301. Buttons 302b through 302g are operation devices that output respective signals when a player presses them. For example, buttons 302b through 302d are respectively an "X" button, a "Y" button and a "B" button and buttons 302e through 302g are respectively a select switch, a menu switch and a start switch, for example. Generally, buttons 302b through 302g are assigned various functions in accordance with the application being executed by game console 100. In an exemplary arrangement shown in FIG. 3A, buttons 302b through 302d are linearly arranged along a front-to-back centerline of the top surface of housing 301. Buttons 302e through 302g are linearly arranged along a left-to-right line between buttons 302b and 302d. Button 302f may be recessed from a top surface of housing 701 to reduce the possibility of inadvertent pressing by a player grasping controller 107.

Button 302h is provided forward of cross-switch 302a on the top surface of the housing 301. Button 302h is a power switch for remote on-off switching of the power to game console 100. Button 302h may also be recessed from a top surface of housing 301 to reduce the possibility of inadvertent pressing by a player.

A plurality (e.g., four) of LEDs 304 is provided rearward of button 302c on the top surface of housing 301. Controller 107 is assigned a controller type (number) so as to be distinguishable from other controllers used with game console 100 and LEDs 304 may be used to provide a player a visual indication of this assigned controller number. For example, when controller 107 transmits signals to wireless controller module 240, one of the plurality of LEDs corresponding to the controller type is lit up.

With reference to FIG. 3B, a recessed portion 308 is formed on a bottom surface of housing 301. Recessed portion 308 is positioned so as to receive an index finger or middle finger of a player holding controller 107. A button 302i is provided on a rear, sloped surface 308a of the recessed portion. Button 302i functions, for example, as an "A" button which can be used, by way of illustration, as a trigger switch in a shooting game.

As shown in FIG. 4, an imaging element 305a is provided on a front surface of controller housing 301. Imaging element 305a is part of the imaging information calculation section of controller 107 that analyzes image data received from markers 108a and 108b. Imaging information calculation section 305 has a maximum sampling period of, for example, about 200 frames/sec., and therefore can trace and analyze even relatively fast motion of controller 107. Additional details of the operation of this section may be found in Application Nos. 60/716,937, entitled "VIDEO GAME SYSTEM WITH WIRELESS MODULAR HANDHELD CONTROLLER," filed on Sep. 15, 2005 (corresponding to U.S. Patent Publication No. 2007-0066394 A1); 60/732,648, entitled "INFORMATION PROCESSING PROGRAM," filed on Nov. 3, 2005 (corresponding to U.S. Patent Publication No. 2007-0072674 A1); and application No. 60/732,649, entitled "INFORMATION PROCESSING SYSTEM AND PROGRAM THEREFOR," filed on Nov. 3, 2005 (corresponding to U.S. Patent Publication No. 2007-0060228 A1). The entire contents of each of these applications are expressly incorporated herein.

Connector 303 is provided on a rear surface of controller housing 301. Connector 303 is used to connect devices to controller 107. For example, a second controller of similar or different configuration may be connected to controller 107 via connector 303 in order to allow a player to play games using game control inputs from both hands. Other devices including game controllers for other game consoles, input devices such as keyboards, keypads and touchpads and output devices such as speakers and displays may be connected to controller 107 using connector 303.

For ease of explanation in what follows, a coordinate system for controller 107 will be defined. As shown in FIGS. 3 and 4, a left-handed X, Y, Z coordinate system has been defined for controller 107. Of course, this coordinate system is described by way of example without limitation and the systems and methods described herein are equally applicable when other coordinate systems are used.

Figure 5A:
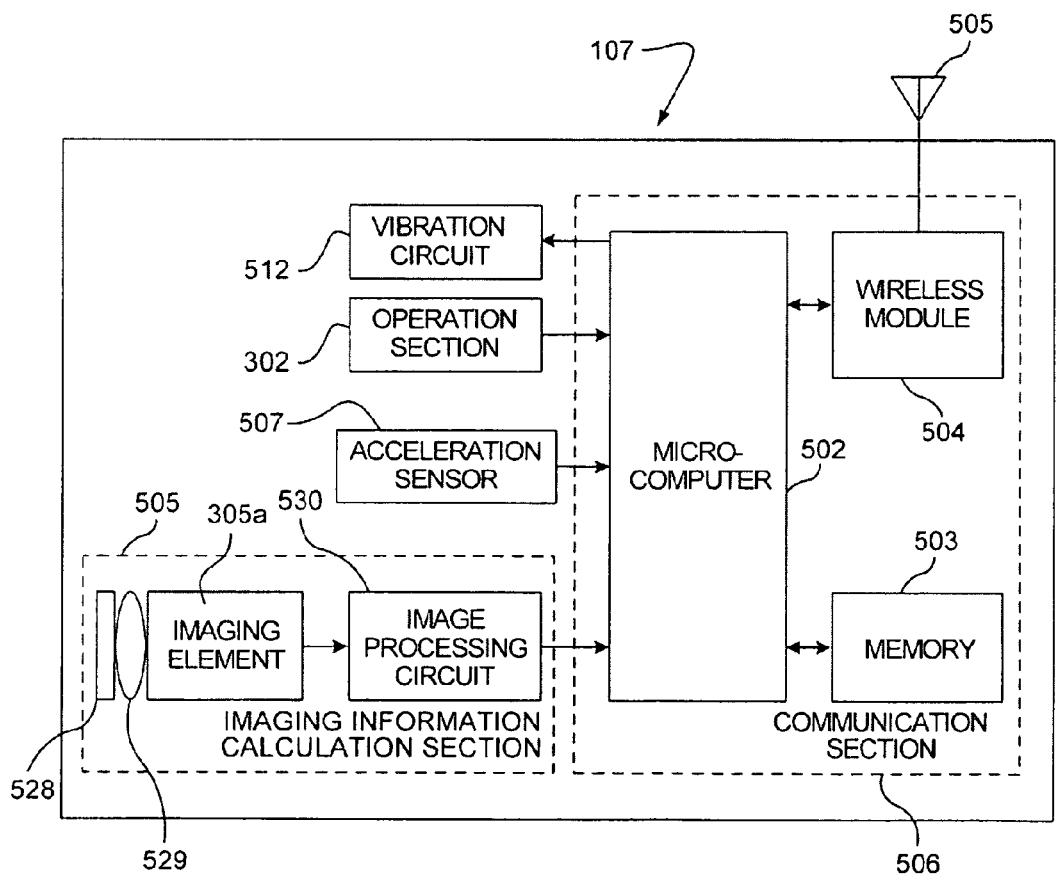
FIG. 5A is a block diagram of example controller 107 shown in FIG. 1.

As shown in the block diagram of FIG. 5A, controller 107 includes a three-axis, linear acceleration sensor 507 that detects linear acceleration in three directions, i.e., the up/down direction (Z-axis shown in FIGS. 3 and 4), the left/right direction (X-axis shown in FIGS. 3 and 4), and the forward/backward direction (Y-axis shown in FIGS. 3 and 4). Alternatively, a two-axis linear accelerometer that only detects linear acceleration along each of the Y-axis and Z-axis, for example, may be used or a one-axis linear accelerometer that only detects linear acceleration along the Z-axis, for example, may be used. Generally speaking, the accelerometer arrangement (e.g., three-axis or two-axis) will depend on the type of control signals desired. As a non-limiting example, the three-axis or two-axis linear accelerometer may be of the type available from Analog Devices, Inc. or STMicroelectronics N.V. Preferably, acceleration sensor 507 is an electrostatic capacitance or capacitance-coupling type that is based on silicon micro-machined MEMS (micro-electromechanical systems) technology. However, any other suitable accelerometer technology (e.g., piezoelectric type or piezoresistance type) now existing or later developed may be used to provide three-axis or two-axis linear acceleration sensor 507.

As one skilled in the art understands, linear accelerometers, as used in acceleration sensor 507, are only capable of detecting acceleration along a straight line corresponding to each axis of the acceleration sensor. In other words, the direct output of acceleration sensor 507 is limited to signals indicative of linear acceleration (static or dynamic) along each of the two or three axes thereof. As a result, acceleration sensor 507 cannot directly detect movement along a non-linear (e.g. arcuate) path, rotation, rotational movement, angular displacement, tilt, position, attitude or any other physical characteristic.

However, through additional processing of the linear acceleration signals output from acceleration sensor 507, additional information relating to controller 107 can be inferred or calculated (i.e., determined), as one skilled in the art will readily understand from the description herein. For example, by detecting static, linear acceleration (i.e., gravity), the linear acceleration output of acceleration sensor 507 can be used to determine tilt of the object relative to the gravity vector by correlating tilt angles with detected linear acceleration. In this way, acceleration sensor 507 can be used in combination with micro-computer 502 of controller 107 (or another processor) to determine tilt, attitude or position of controller 107. Similarly, various movements and/or positions of controller 107 can be calculated through processing of the linear acceleration signals generated by acceleration sensor 507 when controller 107 containing acceleration sensor 507 is subjected to dynamic accelerations by, for example, the hand of a user.

In another embodiment, acceleration sensor 507 may include an embedded signal processor or other type of dedicated processor for performing any desired processing of the acceleration signals output from the accelerometers therein prior to outputting signals to micro-computer 502. For example, the embedded or dedicated processor could convert the detected acceleration signal to a corresponding tilt angle (or other desired parameter) when the acceleration sensor is intended to detect static acceleration (i.e., gravity).

Other types of devices usable to detect or determine movement and/or orientation such as gyroscopes may be used in addition to or as an alternative to the acceleration sensors. By way of example and without limitation, a gyroscope may be used to refine or correct the measurements or readings from an accelerometer.

Returning to FIG. 5A, imaging information calculation section 505 of controller 107 includes infrared filter 528, lens 529, imaging element 305a and image processing circuit 530. Infrared filter 528 allows only infrared light to pass therethrough from the light that is incident on the front surface of controller 107. Lens 529 collects and focuses the infrared light from infrared filter 528 on imaging element 305a. Imaging element 305a is a solid-state imaging device such as, for example, a CMOS sensor or a CCD. Imaging element 305a captures images of the infrared light from markers 108a and 108b collected by lens 529. Accordingly, imaging element 305a captures images of only the infrared light that has passed through infrared filter 528 and generates image data based thereon. This image data is processed by image processing circuit 530 which detects an area thereof having high brightness, and, based on this detecting, outputs processing result data representing the detected coordinate position and size of the area to communication section 506. From this information, the direction in which controller 107 is pointing and the distance of controller 107 from display 101 can be determined.

Figure 5C:
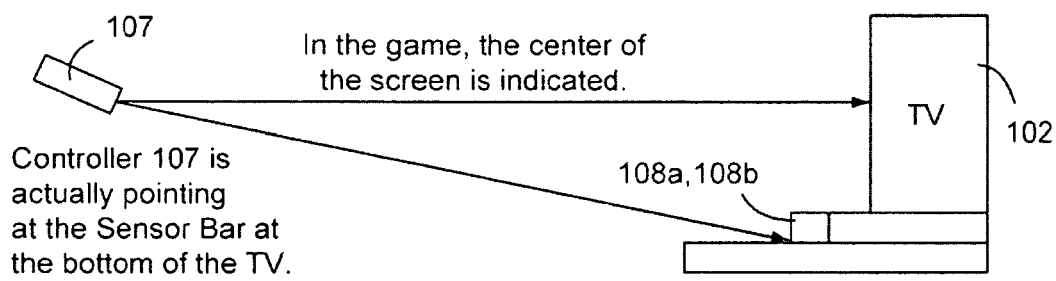
FIG. 5C is used in an explanation of the pointing direction of example controller 107.
Figure 6:
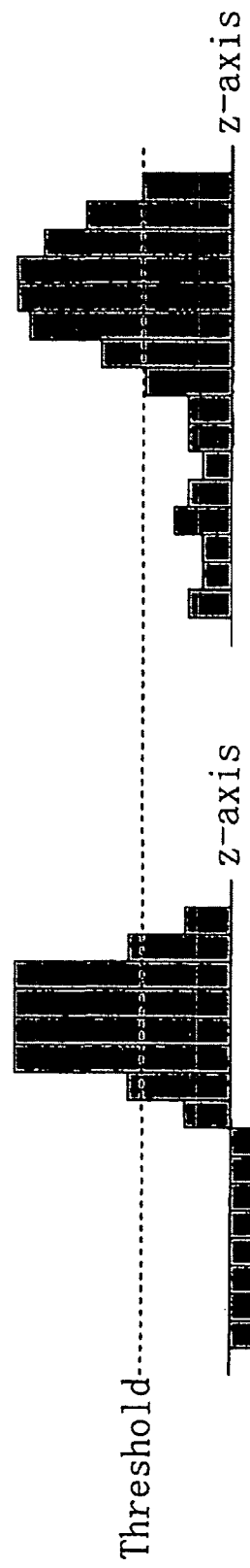

FIGS. 5B-1 to 5B-8 show how a rotation of the controller or a direction in which controller 107 is pointing can be determined using markers 108a, 108b. In this example implementation, controller 107 points to the intermediate coordinates of the two markers on the sensor bar. In an example implementation, the pointer coordinates are 0-1023 on the X-axis and 0-767 on the Y-axis. With reference to FIG. 5B-1, when controller 107 is pointed upward, the coordinates of the markers detected at remote control 107 move down. With reference to FIG. 5B-2, when controller 107 is pointed left, the coordinates of the markers move to the right. With reference to FIG. 5B-3, when the markers are centered, remote controller 107 is pointed at the middle of the screen. With reference to FIG. 5B-4, when controller 107 is pointed right, the coordinates of the markers move to the left. With reference to FIG. 5B-5, when controller 107 is pointed downward, the coordinates of the markers move up. With reference to FIG. 5B-6, when controller 107 is moved away from markers 108a, 108b, the distance between the markers is reduced. With reference to FIG. 5B-7, when controller 107 is moved toward markers 108a, 108b, the distance between the markers increases. With reference to FIG. 5B-8, when controller 107 is rotated, the marker coordinates will rotate.

FIG. 5C shows sensors 108a, 108b positioned below the display screen 101 of the television 102. As shown in FIG. 5C, when controller 107 is pointing toward the sensors, it is not actually pointing at the center of display screen 101. However, the game program or application executed by game machine 100 may treat this situation as one in which controller 107 is pointed at the center of the screen. In this case, the actual coordinates and the program coordinates will differ, but when the user is sufficiently far from the television, his or her brain automatically corrects for the difference between the coordinates seen by the eye and the coordinates for hand movement.

Again returning to FIG. 5A, vibration circuit 512 may also be included in controller 107. Vibration circuit 512 may be, for example, a vibration motor or a solenoid. Controller 107 is vibrated by actuation of the vibration circuit 512 (e.g., in response to signals from game console 100), and the vibration is conveyed to the hand of the player grasping controller 107. Thus, a so-called vibration-responsive game may be realized.

As described above, acceleration sensor 507 detects and outputs the acceleration in the form of components of three axial directions of controller 107, i.e., the components of the up-down direction (Z-axis direction), the left-right direction (X-axis direction), and the front-rear direction (the Y-axis direction) of controller 107. Data representing the acceleration as the components of the three axial directions detected by acceleration sensor 507 is output to communication section 506. Based on the acceleration data which is output from acceleration sensor 507, a motion of controller 107 can be determined.

Communication section 506 includes micro-computer 502, memory 503, wireless module 504 and antenna 505. Micro-computer 502 controls wireless module 504 for transmitting and receiving data while using memory 503 as a storage area during processing. Micro-computer 502 is supplied with data including operation signals (e.g., cross-switch, button or key data) from operation section 302, acceleration signals in the three axial directions (X-axis, Y-axis and Z-axis direction acceleration data) from acceleration sensor 507, and processing result data from imaging information calculation section 505. Micro-computer 502 temporarily stores the data supplied thereto in memory 503 as transmission data for transmission to game console 100. The wireless transmission from communication section 506 to game console 100 is performed at predetermined time intervals. Because game processing is generally performed at a cycle of 1/60 sec. (16.7 ms), the wireless transmission is preferably performed at a cycle of a shorter time period. For example, a communication section structured using Bluetooth (registered trademark) technology can have a cycle of 5 ms. At the transmission time, micro-computer 502 outputs the transmission data stored in memory 503 as a series of operation information to wireless module 504. Wireless module 504 uses, for example, Bluetooth (registered trademark) technology to send the operation information from antenna 505 as a carrier wave signal having a specified frequency. Thus, operation signal data from operation section 302, the X-axis, Y-axis and Z-axis direction acceleration data from acceleration sensor 507, and the processing result data from imaging information calculation section 505 are transmitted from controller 107. Game console 100 receives the carrier wave signal and demodulates or decodes the carrier wave signal to obtain the operation information (e.g., the operation signal data, the X-axis, Y-axis and Z-axis direction acceleration data, and the processing result data). Based on this received data and the application currently being executed, CPU 204 of game console 100 performs application processing. If communication section 506 is structured using Bluetooth (registered trademark) technology, controller 107 can also receive data wirelessly transmitted thereto from devices including game console 100.

Example systems and methods for generating animation in response to movement of a control device will now be described. These example systems and methods are described herein by way of example and without limitation with reference to a gesture (e.g., swing) made during a tennis game played using controller 107 and game console 100. It will be readily apparent that the example systems and methods are not limited in this respect and are applicable to other gestures made using controller 107 and to other types of games.

Application Ser. No. 12/149,922, filed May 9, 2008 describes example systems and methods for recognizing gestures and the contents of this application are incorporated herein in their entirety.

During an example tennis game, game console 100 generates a display of a tennis court on the display screen of television 102. In a singles match, one player character is shown on each side of the net. In such a match, up to two game players may play. For example, a game player may play against another game player or a game player may play against a console-controlled player character. In a doubles match, two player characters are shown on each side of the net. In such a match, up to four game players may play.

Each game player uses a respective game controller 107 to make gestures (such as swings) that simulate playing a real tennis game (e.g., hitting the tennis ball over the net) with a tennis racquet. When these gestures are made, the movement detector (e.g., accelerometer) in the game controller generates outputs that are processed by game console 100 to determine, among other things, the trajectory of the tennis ball that is "hit" by swinging the controller 107 like a tennis racquet. The vibration circuit 512 may be controlled to vibrate when the game player "hits" the ball to provide an enhanced game experience.

FIG. 6 shows example z-axis accelerometer outputs for a swing made in a tennis game using controller 107. As shown in FIG. 6, a z-axis threshold is set and a "swing" is recognized when the z-axis accelerometer output exceeds this threshold. By way of example and without limitation, the z-axis threshold may be set in a range of 1.2 g to 1.5 g, although it will be apparent that other thresholds may be used. This threshold may also be set in dependence on the type of game being played (e.g., tennis, baseball, golf, etc.) and may be varied within a single game if appropriate or desirable (e.g., one threshold for a serve gesture in a tennis game and another different threshold for a volley gesture).

Figure 7A:
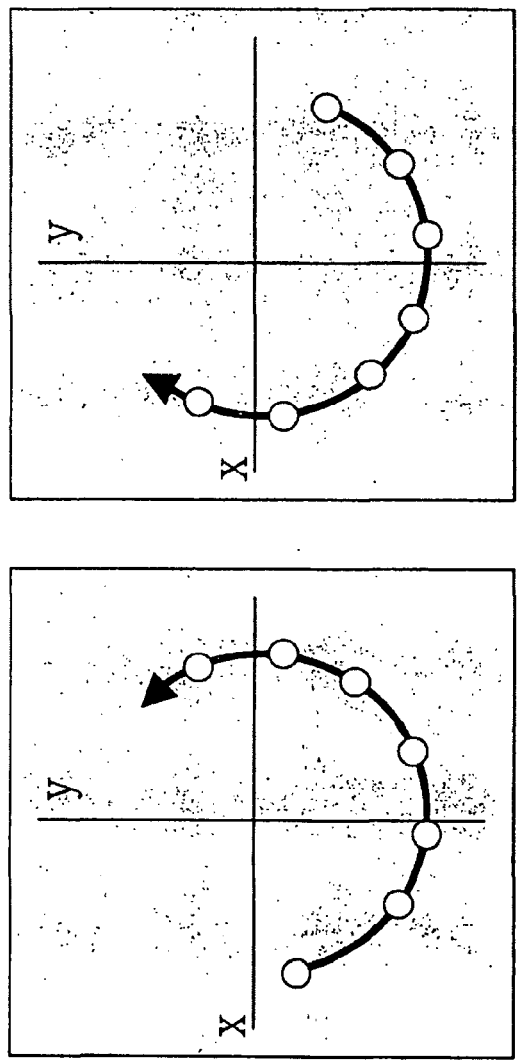
FIG. 7A shows an example of how x-axis and y-axis accelerometer outputs may be used to distinguish between a left and a right swing.

FIG. 7A shows an example of how x-axis and y-axis accelerometer outputs may be used to distinguish between a left and a right swing gesture. As shown in FIG. 7A, an example left swing generates x-axis and y-axis accelerometer outputs that provide a counterclockwise pattern as shown on the left-hand side of FIG. 7A and an example right swing generates x-axis and y-axis accelerometer outputs that provide a clockwise pattern as shown on the right-hand side of FIG. 7A. CPU 204, for example, may therefore process the x-axis and y-axis accelerometer outputs to detect whether a gesture is a left swing or a right swing.

The game player can swing controller 107 to apply top spin, no spin or back spin to the "hit" ball and FIG. 7B shows example x-axis and y-axis accelerometer outputs associated with these respective effects. CPU 204, for example, may therefore process the x-axis and y-axis accelerometer outputs to detect whether a gesture applies top spin, no spin or back spin to the hit ball.

Figure 7C:
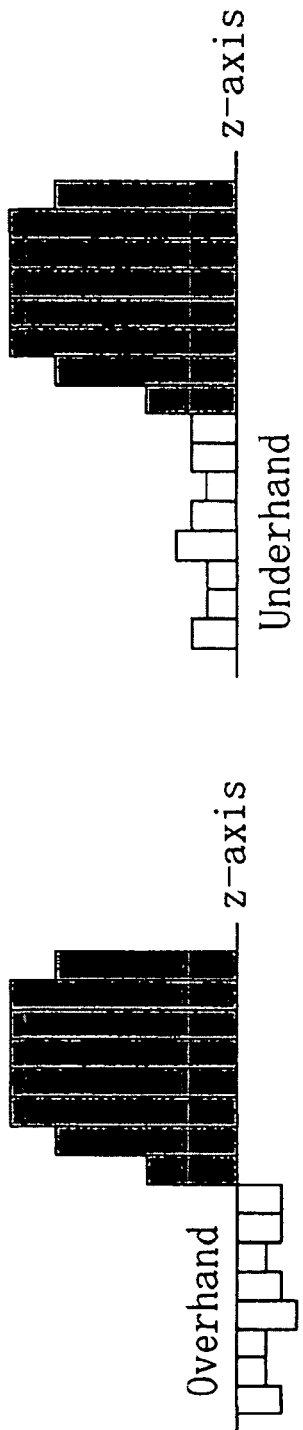
FIG. 7C shows how the z-axis accelerometer outputs can be used to distinguish between overhand and underhand swings.

FIG. 7C shows how the z-axis accelerometer outputs can be used to distinguish between overhand and underhand swings. As shown on the left-hand side of FIG. 7C, the z-axis accelerometer outputs before the swing can be used to determine whether the swing is overhand or underhand. In particular, if the z-axis accelerometer outputs are negative before the swing, the swing gesture is an overhand swing. If the z-axis accelerometer outputs are positive before the swing, the swing gesture is an underhand swing. CPU 204, for example, may therefore process the x-axis and y-axis accelerometer outputs to detect whether a gesture is an overhand or underhand swing.

Figure 7D:
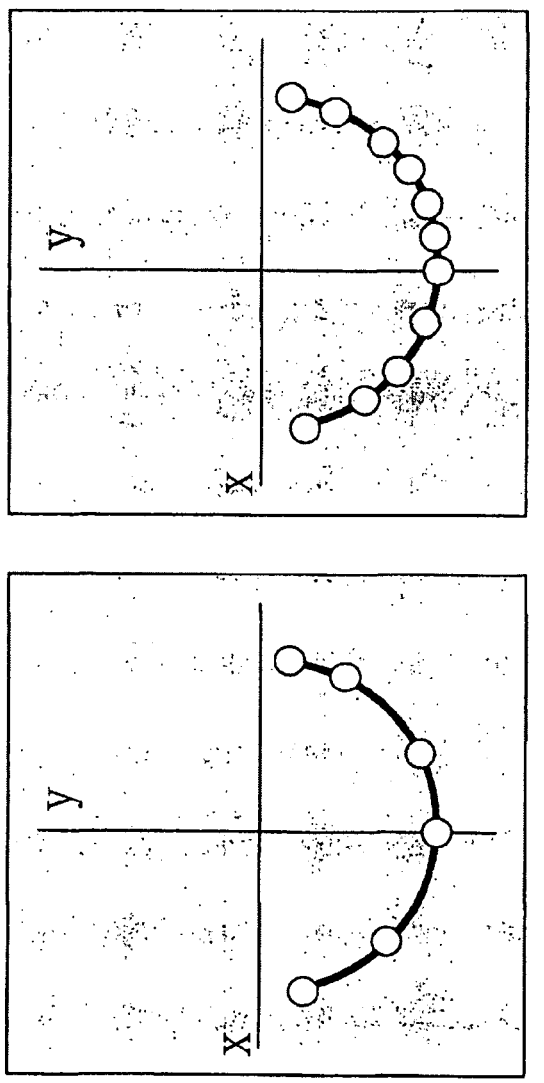
FIG. 7D shows how the x-axis and y-axis accelerometer outputs can be used to distinguish between "hard" and "soft" hits of the tennis ball.

FIG. 7D shows how the x-axis and y-axis accelerometer outputs can be used to distinguish between "hard" and "soft" hits of the tennis ball. The left-hand side of FIG. 7D shows the x-axis and y-axis accelerometer outputs when controller 107 is jerked hard during the swing. In this case, the distance between consecutive points on the plot is relatively large because controller 107 is moved quickly by the hard jerk. The right-hand side of FIG. 7D shows the x-axis and y-axis accelerometer outputs when controller 107 is jerked softly during the swing. In this case, the distance between consecutive points on the plot is relatively small because controller 107 is moved slowly by the soft jerk. CPU 204, for example, may therefore process the x-axis and y-axis accelerometer outputs to detect whether a gesture is a hard or soft swing.

FIGS. 8A-8E show an example timeline of a tennis swing gesture.

Figure 8A:
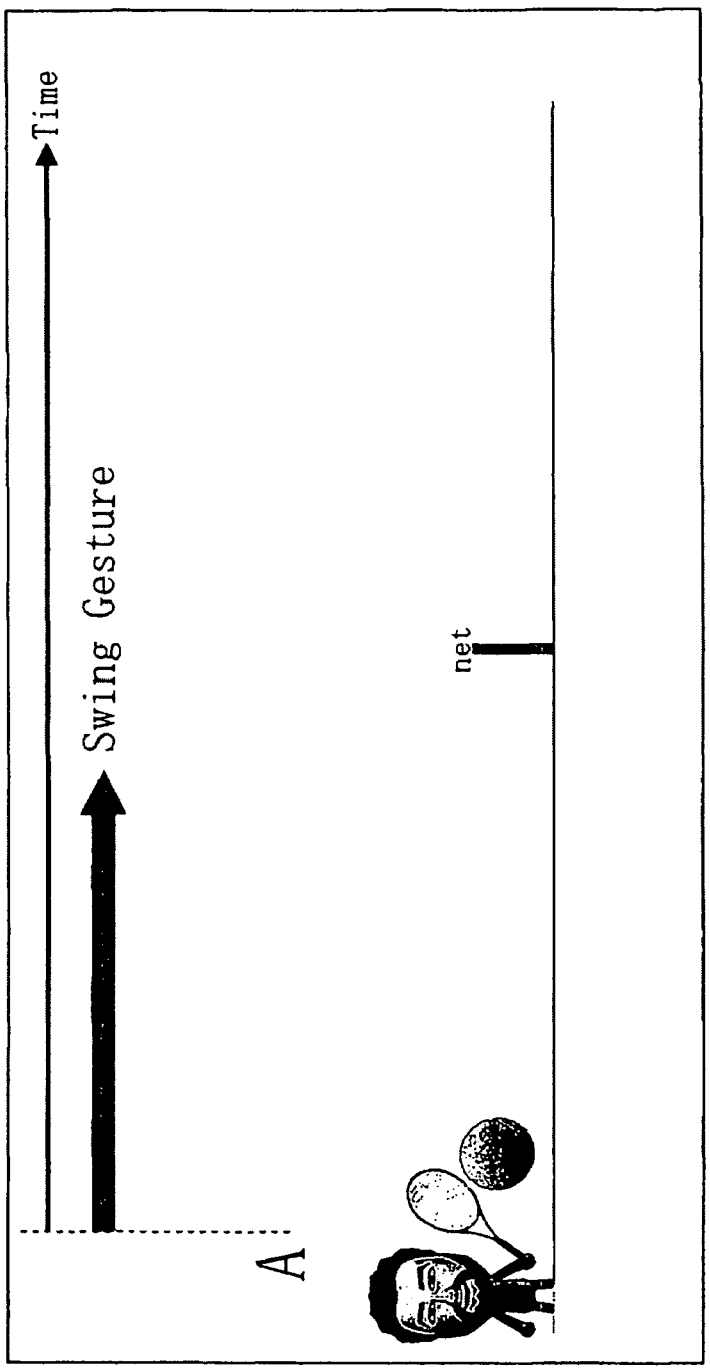
FIGS. 8A-8F show an example timeline of a tennis swing.

FIG. 8A shows a time A at which a swing gesture is started by a game player. As shown in FIG. 8A, the swing gesture continues for a period of time. With reference to FIG. 6, a swing gesture may be recognized when the z-axis accelerometer output exceeds a specified threshold (as determined, for example, by CPU 204).

Figure 8B:
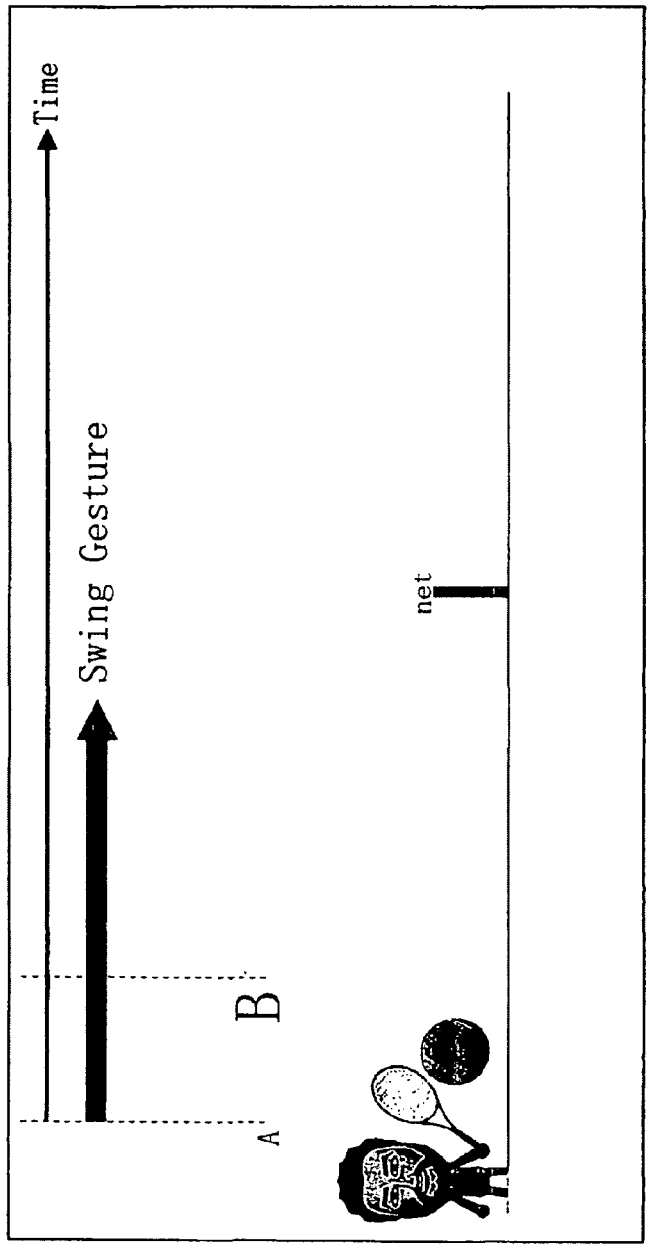

FIG. 8B shows a time B at which a left or right swing is detected. With reference to FIG. 7A, the counterclockwise or clockwise progression of the points in the plots for x-axis and y-axis accelerometer outputs can be used (e.g., by CPU 204) to detect whether the swing gesture is a right swing or a left swing. As shown in FIG. 8B, the detection of left/right swing occurs before the gesture is completed.

Figure 8C:
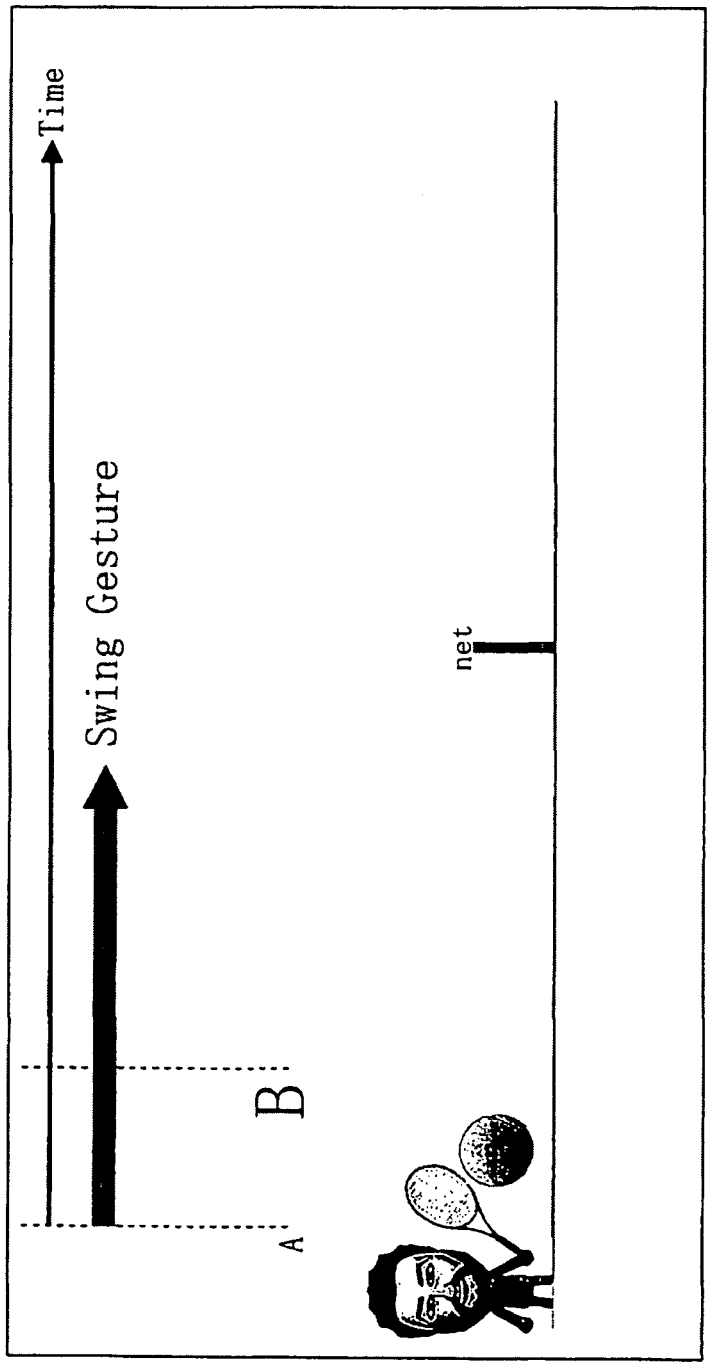

FIG. 8C shows that a detection of an underhand/overhand swing can also occur at time B. This detection can be made (e.g., by CPU 204) with reference to the z-axis accelerometer outputs before the swing as explained with reference to FIG. 7C.

Figure 8D:
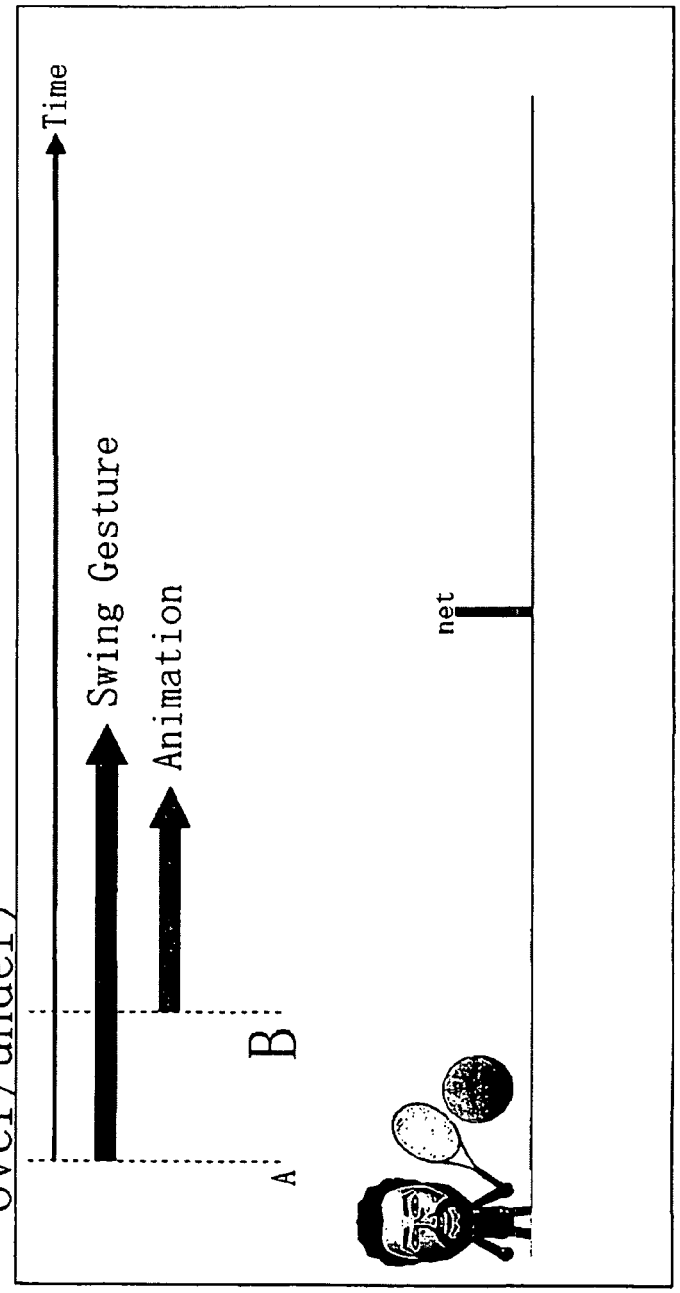

FIG. 8D shows that animation starts at time B. This animation can show the racquet of a player character corresponding to the game player making the gesture using controller 107 making an overhand/underhand left/right swing in accordance with the aforementioned detections. Time B corresponds to the time at which this swing animation starts.

While FIGS. 8B-8D show the left/right detection, underhand/overhand detection and animation start occurring at the same time, this is not required and two or more these events may take place at different times.

Figure 8E:
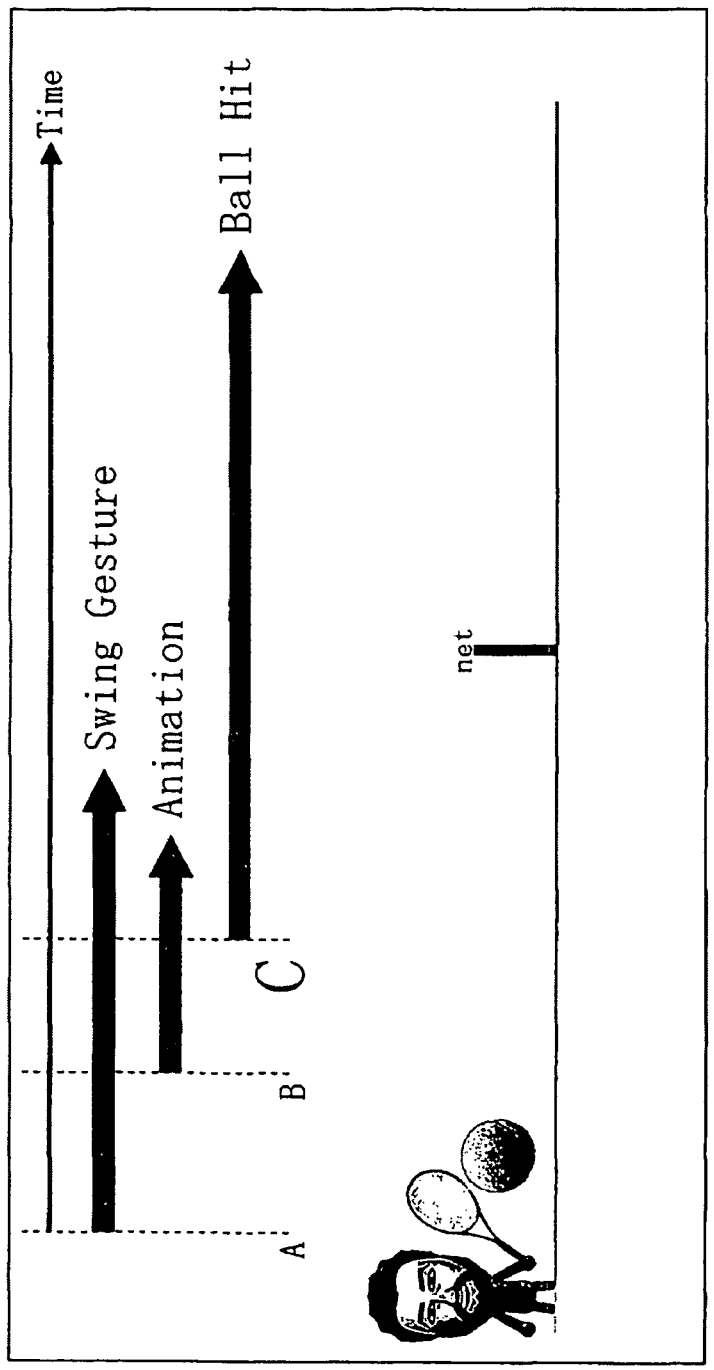

FIG. 8E shows a time C at which the tennis ball is "hit" by the racquet. As suggested in FIG. 8E, the tennis ball is hit before the game player completes the swing gesture. As mentioned above, vibration circuit 512 can be operated at time C to provide feedback to the game player that the ball has been hit.

Figure 8F:
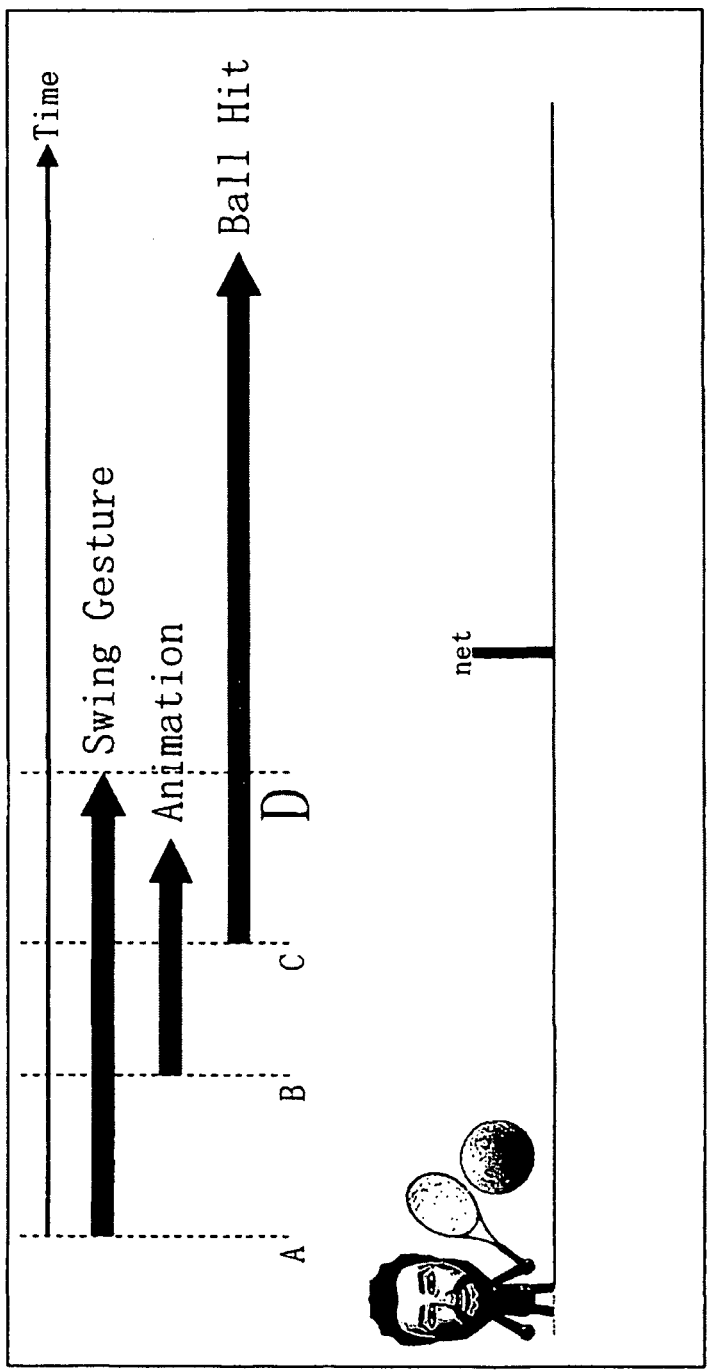

FIG. 8F shows a time D at which the spin and velocity of the hit tennis ball are recognized (detected). As suggested in FIG. 8F, the recognition of spin and velocity occurs when the game player has completed the swing gesture. These recognitions can be made as described with reference to FIGS. 7B and 7D respectively. As explained below, the spin and velocity are used to determine the trajectory of the hit ball.

FIGS. 9A-9D show example trajectories of hit tennis balls.

FIG. 9A shows an example trajectory of a ball hit with high velocity and backspin.

Figure 9B:
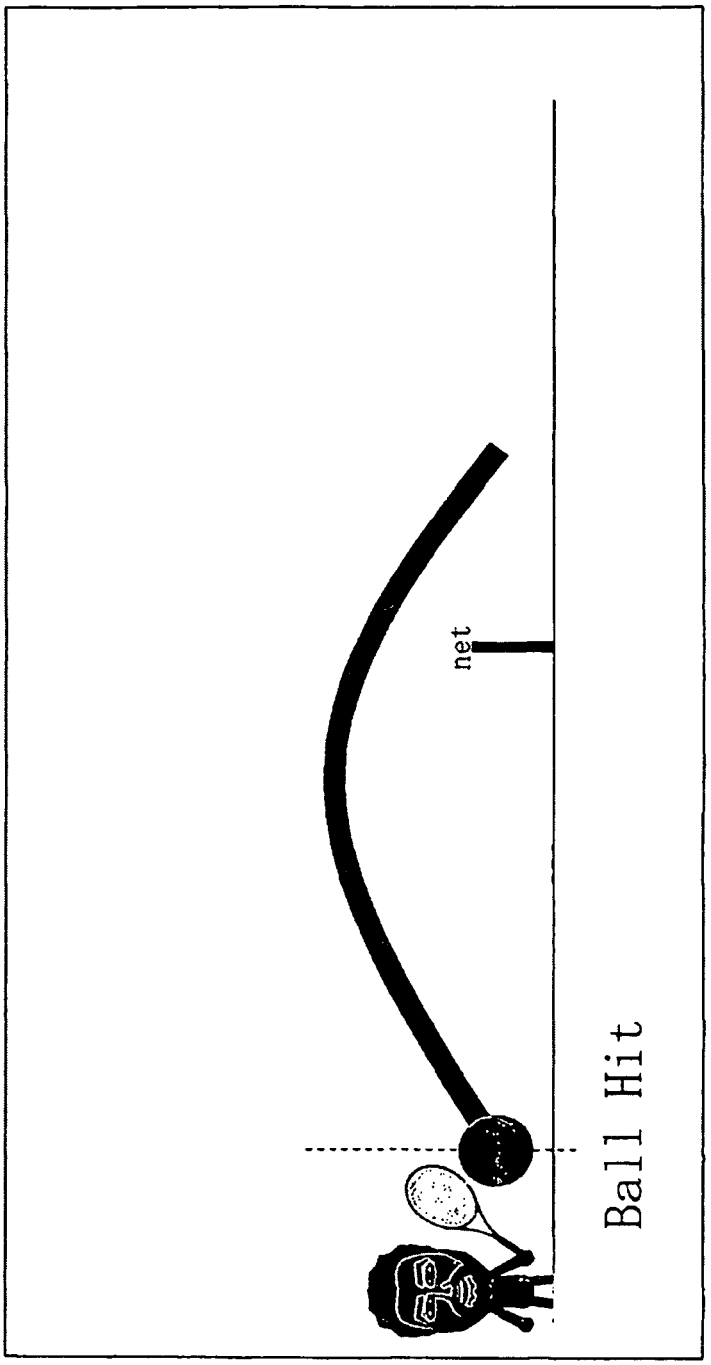

FIG. 9B shows an example trajectory of a ball with "normal" velocity and no spin. "Normal" velocity can refer to a typical velocity with which a ball struck by a player will move.

Figure 9C:
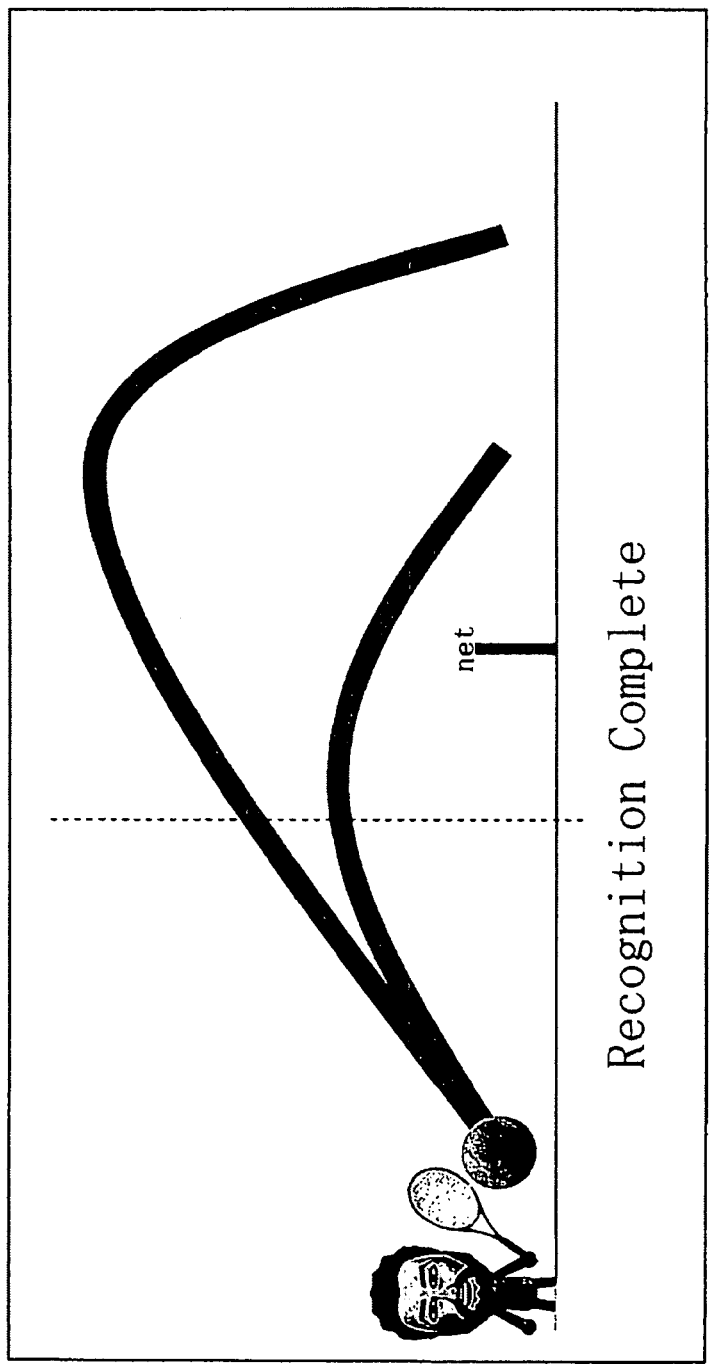

As explained above with reference to FIG. 8E, the tennis ball is "hit" before the game player's gesture is complete and before spin and velocity are recognized (detected). This means that the animation of the hit tennis ball on the display screen of television 102 also begins before the gesture is complete. A problem can therefore arise as shown in FIG. 9C in that the actual trajectory of the ball (e.g., resulting from being hit with high velocity and back spin or normal velocity and no spin or otherwise) is determined after animation of the trajectory begins.

Figure 9D:
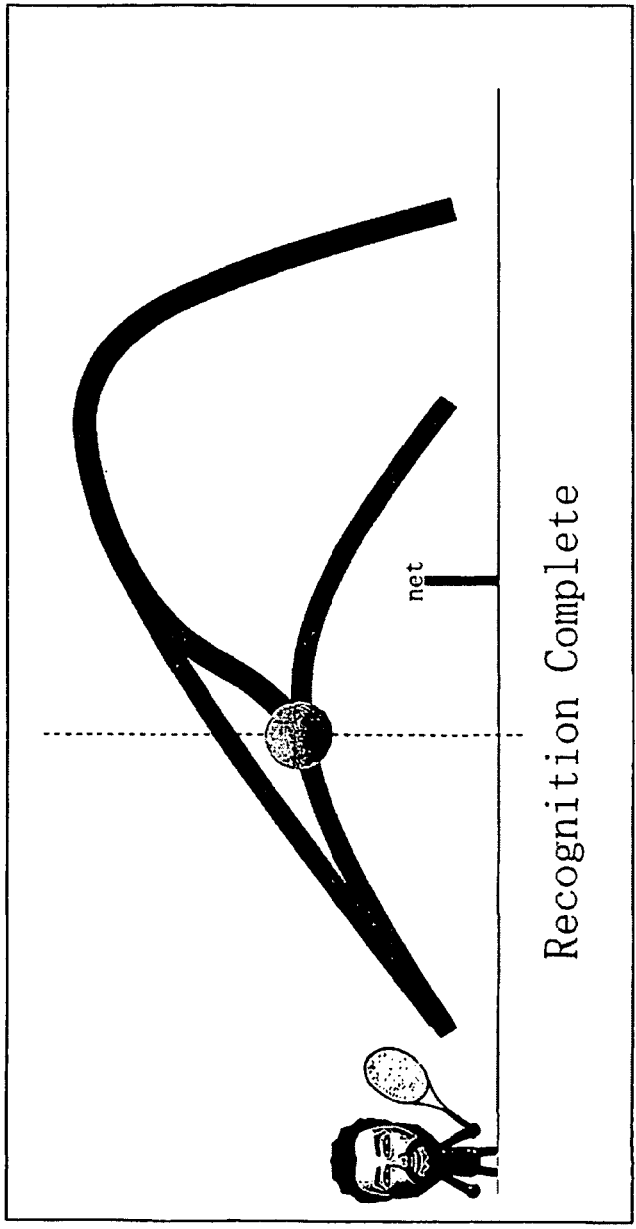

Consequently, as shown in FIG. 9D, the animation of the hit ball initially proceeds along some specified trajectory which may be independent of the spin and velocity resulting from the gesture by the game player. In the FIG. 9D example, this specified trajectory is one associated with a ball hit with normal velocity and no spin. As shown in FIG. 9D, at the point when the game player's gesture is complete and the actual trajectory is determined, the animated ball trajectory is interpolated from the initial specified trajectory to the actual trajectory. In other words, the trajectory of the ball is changed (e.g., by CPU 204) from the specified trajectory to the actual trajectory corresponding to the spin and velocity applied to the ball by the game player's hit. Interpolation can be used to smooth the transition between the specified and actual trajectories.

Of course, other specified trajectories may be used. For example, game console 100 can track a game player's tendency to hit certain shots and if a particular game player has a tendency to hit shots with high velocity and backspin, the specified trajectory for that game player may be that shown in FIG. 9A.

While the above systems and methods have been described in terms of hitting or striking a tennis ball, it will be readily apparent that they are applicable to gestures used for hitting or striking other objects such as baseballs, softballs, hockey pucks, golf balls, soccer balls, footballs, pool (billiard) balls, volleyballs, shuttlecocks (birdies), cricket balls, etc. The disclosed systems and methods may also be applied to gestures for throwing or tossing objects such as baseballs, softballs, soccer balls, footballs, bowling balls, jai alai balls, bocce balls, lacrosse balls, cricket balls, etc.

The systems and methods described herein may be implemented in hardware, firmware, software and combinations thereof. Software or firmware may be executed by a general-purpose or specific-purpose computing device including a processing system such as a microprocessor and a microcontroller. The software may, for example, be stored on a storage medium (optical, magnetic, semiconductor or combinations thereof) and loaded into a RAM for execution by the processing system. The systems and methods described herein may also be implemented in part or whole by hardware such as application specific integrated circuits (ASICs), field programmable gate arrays (FPGAs), logic circuits and the like.

While the systems and methods have been described in connection with what is presently considered to practical and preferred embodiments, it is to be understood that these systems and methods are not limited to the disclosed embodiments, but on the contrary, is intended to cover various modifications and equivalent arrangements included within the spirit and scope of the appended claims.

We claim:

1. An image processing system comprising:
   a control device including a movement detector; and
   a processing system that receives inputs corresponding to
      a gesture made by moving the control device, begins an animation of an object along an initial trajectory which is independent of one or more aspects of the gesture received prior to completion of the gesture, and modifies the animation of the object to be along a subsequent trajectory based on at least the one or more aspects of the gesture received after the beginning of the animation.

2. The image processing system according to claim 1, wherein the movement detector comprises an accelerometer.

3. The image processing system according to claim 1, wherein the movement detector comprises a gyroscope.

4. The image processing system according to claim 1, wherein the movement detector comprises an accelerometer and a gyroscope.

5. A method comprising:
receiving inputs corresponding to a gesture made by moving a control device;
beginning an animation of an object along an initial trajectory which is independent of one or more aspects of the gesture received prior to completion of the gesture; and
modifying the animation of the object to be along a subsequent trajectory based on at least the one or more aspects of the gesture received after the beginning of the animation.

6. The method according to claim 5, wherein the inputs correspond to accelerometer outputs.

7. The method according to claim 5, wherein the inputs correspond to gyroscope outputs.

8. The method according to claim 5, wherein the inputs corresponds to gyroscope and accelerometer outputs.

9. A non-transitory computer-readable medium having computer readable code embodied therein which, when executed by a computer, cause the computer to perform operations comprising:
receiving inputs corresponding to a gesture made by moving a control device;
beginning an animation of an object along an initial trajectory which is independent of one or more aspects of the gesture received prior to completion of the gesture; and
modifying the animation of the object to be along a subsequent trajectory based on at least the one or more aspects of the gesture received after the beginning of the animation.

10. An image processing system for providing animation of a trajectory of a struck object, comprising:
a control device including a movement detector; and
a processing system that receives inputs corresponding to a gesture made by moving the control device to simulate striking an object, begins animation of a trajectory of the struck object which is independent of one or more aspects of the gesture received prior to completion of the gesture, and modifies the animation of the trajectory to a subsequent trajectory based on at least the one or more aspects of the gesture received after the beginning of the animation.

11. The image processing system according to claim 10, wherein the movement detector comprises an accelerometer.

12. The image processing system according to claim 10, wherein the movement detector comprises a gyroscope.

13. The image processing system according to claim 10, wherein the movement detector comprises an accelerometer and a gyroscope.

14. The image processing system according to claim 10, wherein the struck object comprises a ball.

15. A method comprising:
receiving inputs corresponding to a gesture made by moving a control device to simulate striking an object;
beginning animation of a trajectory of the struck object which is independent of one or more aspects of the gesture received prior to completion of the gesture; and
modifying the animation of the trajectory to a subsequent trajectory based on at least the one or more aspects of the gesture received after the beginning of the animation.

16. The method according to claim 15, wherein the inputs correspond to accelerometer outputs.

17. The method according to claim 15, wherein the inputs correspond to gyroscope outputs.

18. The method according to claim 15, wherein the inputs corresponds to gyroscope and accelerometer outputs.

19. A non-transitory computer-readable medium having computer readable code embodied therein which, when executed by a computer causes the computer to perform operations comprising:
receiving inputs corresponding to a gesture made by moving a control device to simulate striking an object;
beginning animation of a trajectory of the struck object which is independent of one or more aspects of the gesture received prior to completion of the gesture; and
modifying the animation of the trajectory to a subsequent trajectory based on at least the one or more aspects of the gesture received after the beginning of the animation.

* * * * *